(12) United States Patent
Cheng (10) Patent No.: US 12,236,342 B2
(45) Date of Patent: Feb. 25, 2025

(54) TENSOR RING DECOMPOSITION FOR NEURAL NETWORKS

(71) Applicant: Baidu USA, LLC, Sunnyvale, CA (US)

(72) Inventor: Zhiyu Cheng, Sunnyvale, CA (US)

(73) Assignee: Baidu USA LLC, Sunnyvale, CA (US)

( * ) Notice: Subject to any disclaimer, the term of this patent is extended or adjusted under 35 U.S.C. 154(b) by 1123 days.

(21) Appl. No.: 17/076,184

(22) Filed: Oct. 21, 2020

(65) Prior Publication Data

US 2022/0121926 A1    Apr. 21, 2022

(51) Int. Cl.
*G06N 3/08* (2023.01)
*G06N 3/04* (2023.01)

(52) U.S. Cl.
CPC .............. *G06N 3/08* (2013.01); *G06N 3/04* (2013.01)

(58) Field of Classification Search
None
See application file for complete search history.

(56) References Cited

U.S. PATENT DOCUMENTS

2020/0090049 A1* 3/2020 Aliper ................. G06F 18/2137

OTHER PUBLICATIONS

"Tensor Ring Decomposition," Zhao et al; Zhao (Year: 2016).*
"Demystify Deep Learning: Recursive Neural Tensor Networks," Bhattacharjee (Year: 2019).*
"Tensors ("N-Dimensional Arrays")," Github (Year: 2020).*
"Objective Functions in Machine Learning," Kronosapiens Labs (Year: 2017).*
"What is an Objective Function?" TED AI San Francisco (Year: 2024).*

* cited by examiner

*Primary Examiner* — Michael J Huntley
*Assistant Examiner* — Paul J Breene
(74) *Attorney, Agent, or Firm* — Oppedahl Patent Law Firm LLC (57) ABSTRACT

Various embodiments for tensor decomposition to compress neural network models are presented. In one or more embodiments, one or more neural network layers from a neural network model are compressed using tensor ring (TR) decomposition. In one or more embodiments, a TR-decomposed neural network utilizes fewer resources and can be more readily deployed on resource-constraint devices. With a smaller model size, during inference time, the compressed model runs faster than its original model and consumes less power. Furthermore, the TR-compressed model can achieve better performance in terms of stability and model accuracy, compared to other tensor decomposition methods.

16 Claims, 7 Drawing Sheets

TENSOR RING DECOMPOSITION FOR NEURAL NETWORKS

BACKGROUND

A. Technical Field

The present disclosure relates generally to systems and methods for computer learning that can provide improved computer performance, features, and uses. More particularly, the present disclosure relates to systems and methods being able to use complex neural networks on resource-constrained devices.

B. Background

Neural networks have achieved great successes in many domains, such as computer vision, natural language processing, recommender systems, etc. One type of neural network is convolutional neural networks. Three-dimensional convolutional neural networks (3D-CNN) have been applied to various tasks of video understanding, such as classification, action recognition, and segmentation. However, the space and computation complexity of 3D-CNN are much larger than the traditional two-dimensional convolutional neural networks. Therefore, performing video understanding tasks with 3D-CNN on resource-constraint devices, such as mobile phones and cameras, becomes very difficult or is not possible.

Accordingly, what is needed are ways in which complex neural networks, such as 3D-CNNs, may be utilized on resource-constrained devices.

BRIEF DESCRIPTION OF THE DRAWINGS

References will be made to embodiments of the disclosure, examples of which may be illustrated in the accompanying figures. These figures are intended to be illustrative, not limiting. Although the disclosure is generally described in the context of these embodiments, it should be understood that it is not intended to limit the scope of the disclosure to these particular embodiments. Items in the figures may not be to scale.

DETAILED DESCRIPTION OF EMBODIMENTS

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system, a device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. The terms "include," "including," "comprise," and "comprising" shall be understood to be open terms and any lists the follow are examples and not meant to be limited to the listed items. A "layer" may comprise one or more operations. The words "optimal," "optimize," "optimization," and the like refer to an improvement of an outcome or a process and do not require that the specified outcome or process has achieved an "optimal" or peak state. The use of memory, database, information base, data store, tables, hardware, cache, and the like may be used herein to refer to system component or components into which information may be entered or otherwise recorded.

In one or more embodiments, a stop condition may include: (1) a set number of iterations have been performed; (2) an amount of processing time has been reached; (3) convergence (e.g., the difference between consecutive iterations is less than a first threshold value); (4) divergence (e.g., the performance deteriorates); and (5) an acceptable outcome has been reached.

One skilled in the art shall recognize that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. Each reference/document mentioned in this patent document is incorporated by reference herein in its entirety.

It shall be noted that any experiments and results provided herein are provided by way of illustration and were performed under specific conditions using a specific embodiment or embodiments; accordingly, neither these experiments nor their results shall be used to limit the scope of the disclosure of the current patent document.

A. General Introduction

Machine learning models are being used in increasingly more applications. However, as the nature of the tasks being solved using machine learning increase in complexity, so too do the models. Consider, by way of example, video content analysis. Conventional approaches to solve the problem generally fall into two categories: (1) directly use a 3D-CNN model or its variations to analyze video content; and (3) use a 2D CNN and a recurrent convolutional network to perform video understanding tasks. However, each of these prior approaches has disadvantages. The first group tends to consume large computation and memory resources; thereby making them difficult—if not impossible—to deploy on embedded devices, which have limited resources. As noted above, computationally involved and complex neural networks can require fairly extensive resources (e.g., power, memory, computation power, etc.) to operate. However, devices that do have sufficient resources (e.g., do not have enough power, memory, processing power) may not be able to use such models. They can also be rather slow during inference. The second group can also suffer from the same problems as the first group, but they also tend to be bad at capturing temporal information and learning temporal representations in the video.

Tensor decomposition has been proved to be effective for solving many problems in signal processing and machine learning. In particular, compressing deep convolutional neural networks with various tensor decomposition techniques has become very popular among computer vision and deep learning researchers and practitioners.

In this patent document, embodiments are presented that use novel tensor ring decomposition approaches to compress neural network models and therefore allow for the deployment of large deep learning models on embedded devices in a resource-efficient manner.

B. Tensor Ring (TR) Decomposition Embodiments

There are many forms of tensor decomposition, such as Canonical Polyadic (CP) decomposition, Tucker decomposition, tensor train decomposition, and tensor ring decomposition. Various embodiments herein focus on tensor ring (TR) decomposition because it is more compact than CP and Tucker decomposition and is more stable than tensor train decomposition in training, particularly for convolutional neural networks.

Figure 1:
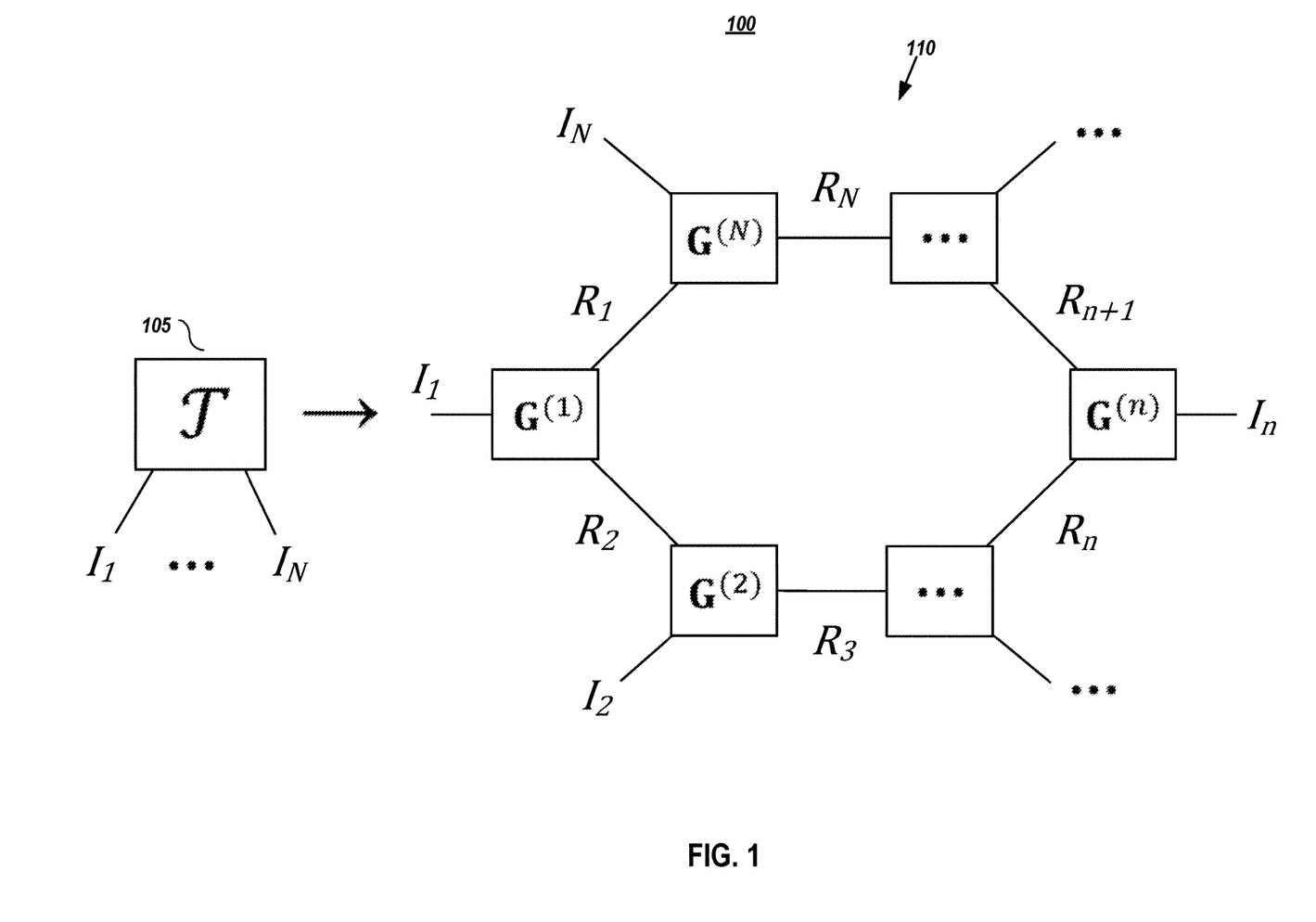
FIG. 1 depicts tensor ring (TR) decomposition, according to embodiments of the present disclosure.

As graphically depicted in FIG. 1, tensor ring (TR) decomposition aims to represent a high-order or high-dimensional tensor 105 by a sequence 110 of $3^{rd}$-order tensors that are multiplied circularly. That is, given a tensor $\mathcal{T} \in \mathbb{R}^{I_1 \times I_2 \times \cdots \times I_N}$, $\mathcal{T}$ may be decomposed in TR-format as:

$$\mathcal{T}_{i_1, i_2, \ldots, i_N} \approx \sum_{r_1=1}^{R_1} \sum_{r_2=1}^{R_2} \cdots \sum_{r_N=1}^{R_N} \mathcal{G}^1_{r_1, i_1, r_2} \mathcal{G}^2_{r_2, i_2, r_3} \cdots \mathcal{G}^N_{r_N, i_N, r_{N+1}} \quad (1)$$

$$= Tr\{G^{(1)}[i_1] \cdot G^{(2)}[i_2] \cdot \ldots \cdot G^{(N)}[i_N]\}$$

where $\{\mathcal{G}^n\}_{n=1}^N$ is a collection of tensor cores with $\mathcal{G}^n \in \mathbb{R}^{R_n \times I_n \times R_{n+1}}$. Note the last tensor core is of size $R_N \times I_N \times R_1$, i.e., $R_{N+1} = R_1$, which relaxes the rank constraint of $R_{N+1} = R_1 = 1$ in tensor train decomposition. Tr denotes the trace operation. The parameter size of the tensor is reduced with tensor ring format.

Tensor ring format may be considered as a linear combination of tensor train format, and it has the property of circular dimensional permutation invariance and does not require strict ordering of multilinear products between cores due to the trace operation. Therefore, intuitively it offers a more powerful and generalized representation ability compared to tensor train format. In one or more embodiments, tensor ring decomposition is used to compress neural networks, which is discussed in the next section.

C. Embodiments of TR Decomposition for Neural Network

It shall be noted that although embodiments described herein may be within the context of convolutional neural networks, aspects of the present disclosure are not so limited. Accordingly, the aspects of the present disclosure may be applied or adapted for use with other neural networks and in other contexts. For example, embodiments may be extended to shrink other large models for other tasks beyond video understanding with spatio-temporal data, such as analyzing pure 3D data from depth cameras, recognition of stacking utterances from speech data, etc.

Figure 2:
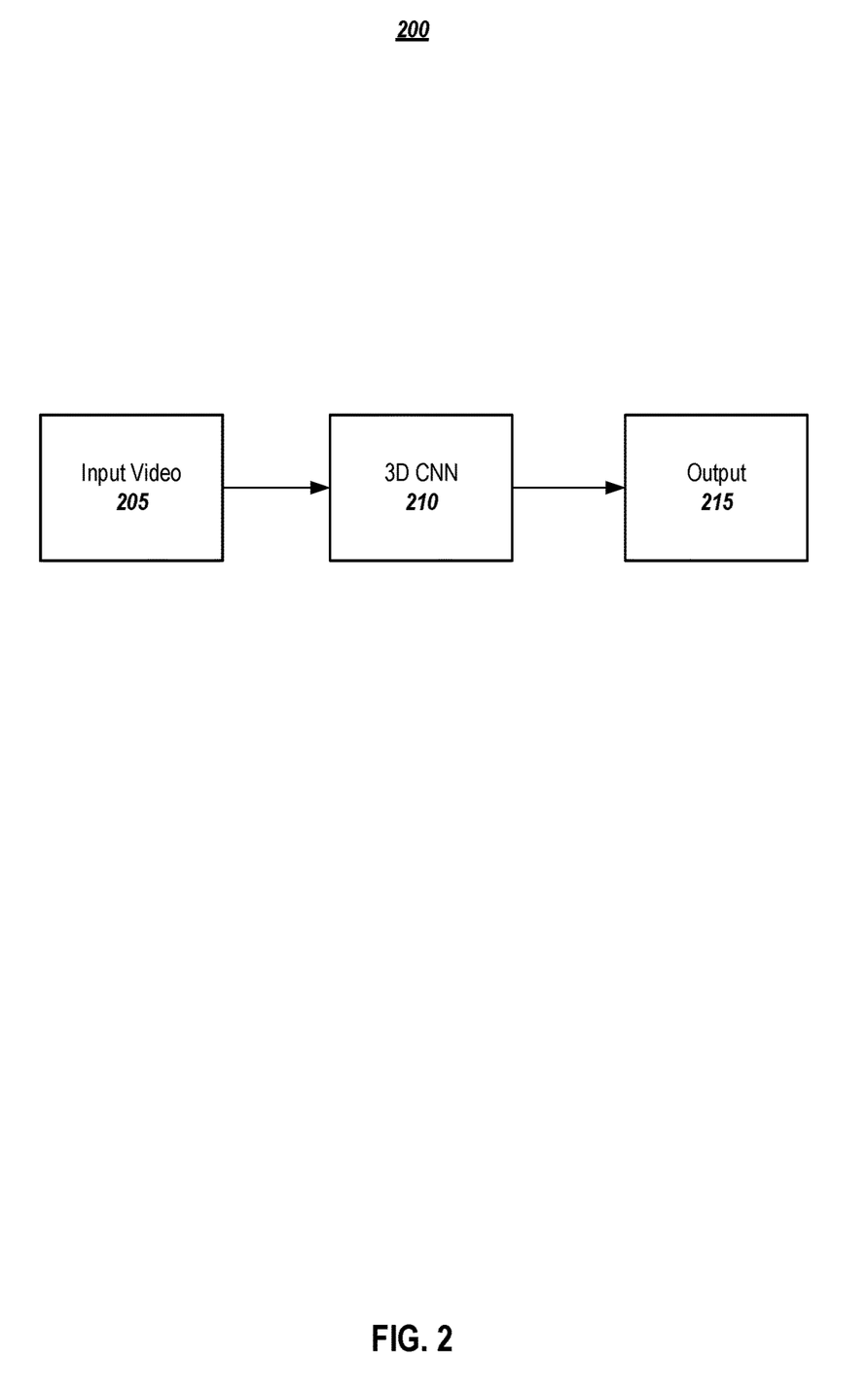
FIG. 2 depicts an example flow of a three-dimensional convolutional neural network, according to embodiments of the present disclosure.

Three-dimensional convolutional neural networks (3D-CNN) may be used for a variety of video understanding tasks, such as classification, action recognition, and segmentation. As illustrated in FIG. 2, given a video input 205, a 3D convolutional neural network 210 may be used to analyze its content from both spatial and temporal domain and produce a predictive output 215. For example, the 3D convolutional neural network may predict and classify if there is a person involved in an activity in the video.

Figure 3:
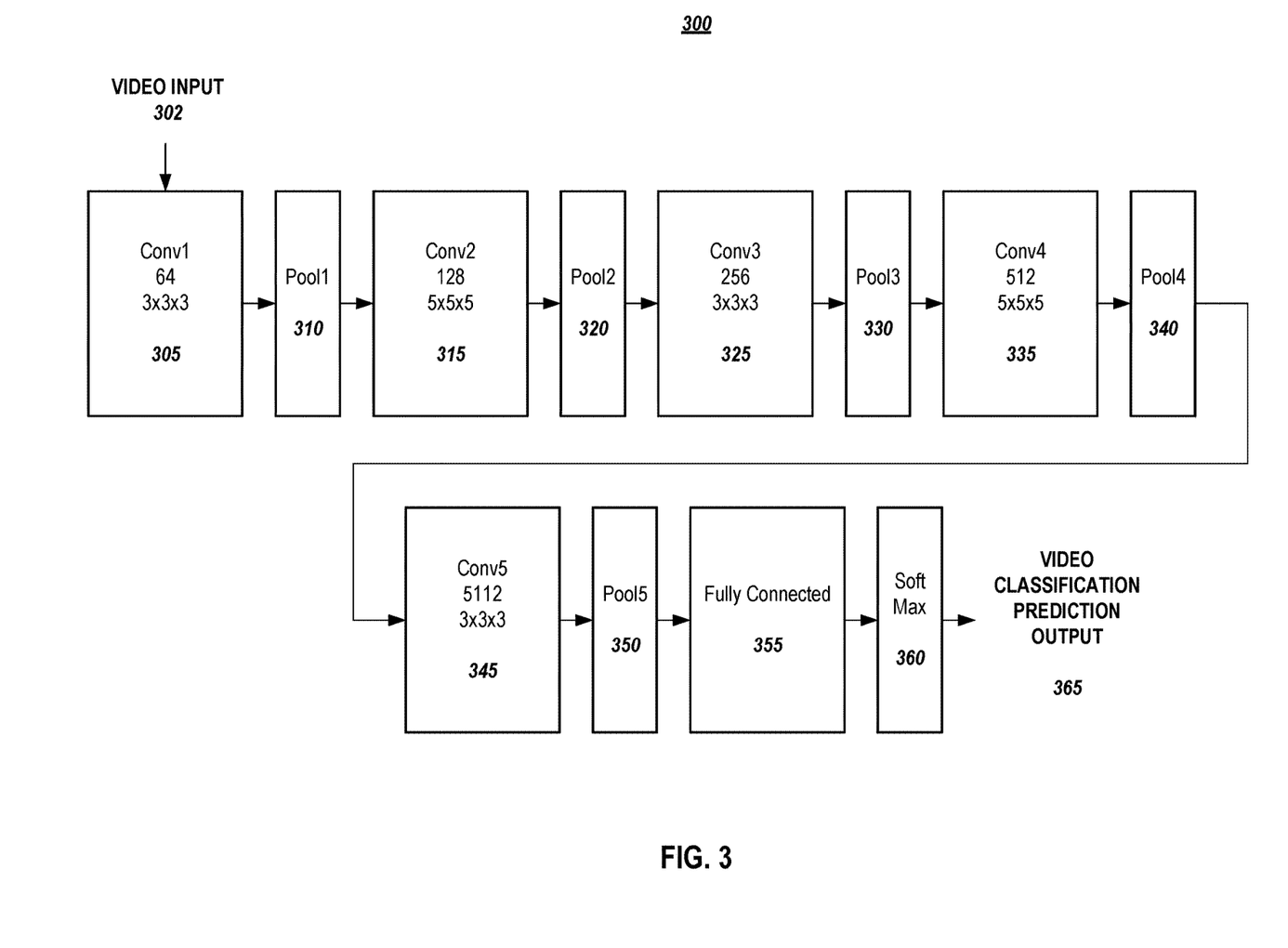
FIG. 3 depicts an example of 3D convolutional neural networks, according to embodiments of the present disclosure.

FIG. 3 depicts an example of 3D convolutional neural networks, according to embodiments of the present disclosure. As illustrated, the example 3D CNN comprises five (5) convolutional layers 305, 315, 325, 335, and 345, five (5) pooling layers 310, 320, 330, 340, and 350, one (1) fully-connected layer 355, and one (1) softmax layer 360. The 3D CNN 300 receives a video input 302 and predicts a video classification result or results 365. The numbers (64, 128, etc.) in the convolutional layer block represent the number of filters used in the convolution operation, and the kernels are 3D (e.g., 3×3×3 or 5×5×5) with stride 1. It shall be noted that the depicted embodiment in FIG. 3 is one example of a 3D CNN—other embodiments may also be used. Given a 3D CNN, a goal is to obtain a corresponding three-dimensional (3D) convolution with kernel in tensor ring format for a video understanding task.

In one or more embodiments, each convolutional layer of a set of one or more convolution layers of a 3D-CNN model may be compressed. That is, a 3D convolutional kernel in a layer may be reconstructed to a dth-order tensor with relatively balanced size, and the TR format may be used on this tensor. For a 3D convolutional kernel, $\mathcal{K}_{3D} \in \mathbb{R}^{t \times h \times w \times C \times S}$, a mapping may be made to transfer the entry from $\mathcal{K}_{3D}$ to a new 4th-order tensor, $\mathcal{W}_{3D} \in \mathbb{R}^{k_1 \times k_2 \times C \times S}$, with the constraint thw=$k_1 k_2$. Given values for $k_1$ and $k_2$, tensor cores for $\mathcal{W}_{3D}$ may be constructed.

Regarding the compression ratio that can be achieved using an embodiment herein, it relates to the tensor ring rank. In general, instead of having $\Pi_{i=1}^{N} d_i R^2$ parameters, with tensor ring decomposition, there are $\Sigma_{i=1}^{N} d_i R^2$ parameters. Note $d_i$ is one of the N factors used to factorize the weight tensor.

Figure 4:
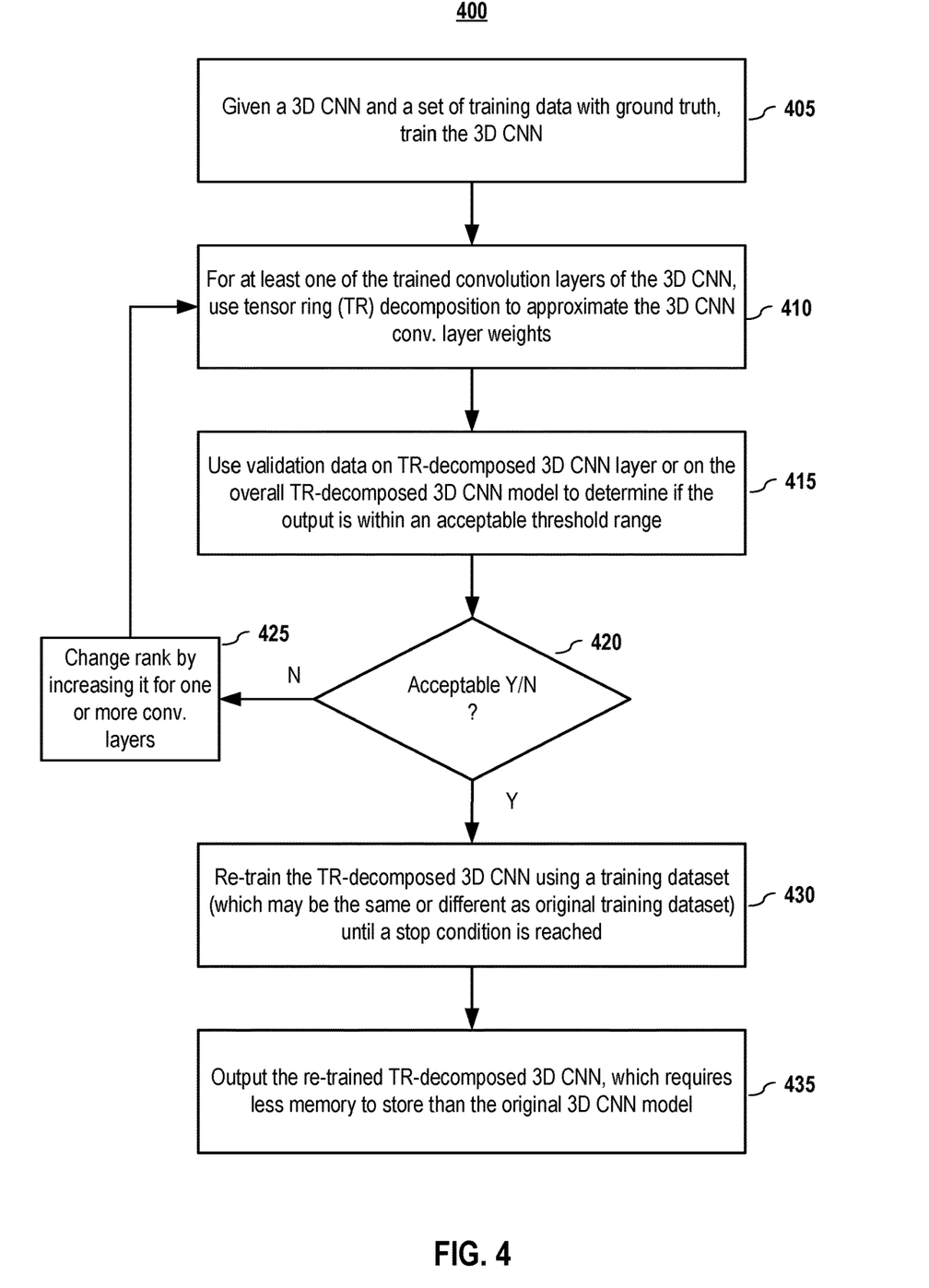
FIG. 4 depicts a method for compressing a neural network using tensor ring decomposition, according to embodiments of the present disclosure.

FIG. 4 depicts a method for compressing a neural network using tensor ring decomposition, according to embodiments of the present disclosure. Given a neural network, such as a 3D CNN, and a set of training data with ground truth, the neural network model is trained (405) to obtain a trained multi-dimensional neural network. In one or more embodiments, given the trained multi-dimensional neural network, for each neural network layer from a set of one or more neural network layers from the trained multi-dimensional neural network, tensor ring (TR) decomposition is used (410) to approximate the neural network layer to obtain a TR-decomposed neural network layer and to obtain a corresponding TR-decomposed multi-dimensional neural network that comprises one or more TR-decomposed neural network layers. In one or more embodiments, the set of neural network layers may be all of the neural networks of the model, all of the neural network of a certain type or types, or subsets thereof.

In one or more embodiments, the performance of a compressed layer or on the overall compress model may be checked for acceptability. Thus, in one or more embodiments, validation data may be applied (415) on the TR-decomposed neural network layer or on the TR-decomposed multi-dimensional neural network model to determine if an output (e.g., either a layer output or the model output) is within an acceptable threshold. In one or more embodiments, the acceptance threshold may be based upon comparison of the output from the compressed layer or model relative to the output from the corresponding neural network layer from the trained multi-dimensional neural network or from the trained multi-dimensional neural network.

Responsive to the output not meeting (425) an acceptable threshold value or range, the rank for TR-decomposition of one or more of the neural network layers in the set of one or more neural network layers may be increased (430), and the process returns to step 410.

In one or more embodiments, responsive to the output meeting (425) an acceptable threshold value, the TR-decomposed multi-dimensional neural network may be re-trained (435) using a training dataset until a stop condition is reached. In one or more embodiments, the training dataset may be the same data that was used to initialize train the model or may be a different dataset. Following re-training, the re-trained TR-decomposed multi-dimensional neural network may be output (440) for use. It shall be noted that the re-trained TR-decomposed multi-dimensional neural network takes fewer resources to store and to operate than the original neural network. Thus, the re-trained TR-decomposed multi-dimensional neural network can be more widely deployed because even resource-constrained devices may be used.

Figure 5:
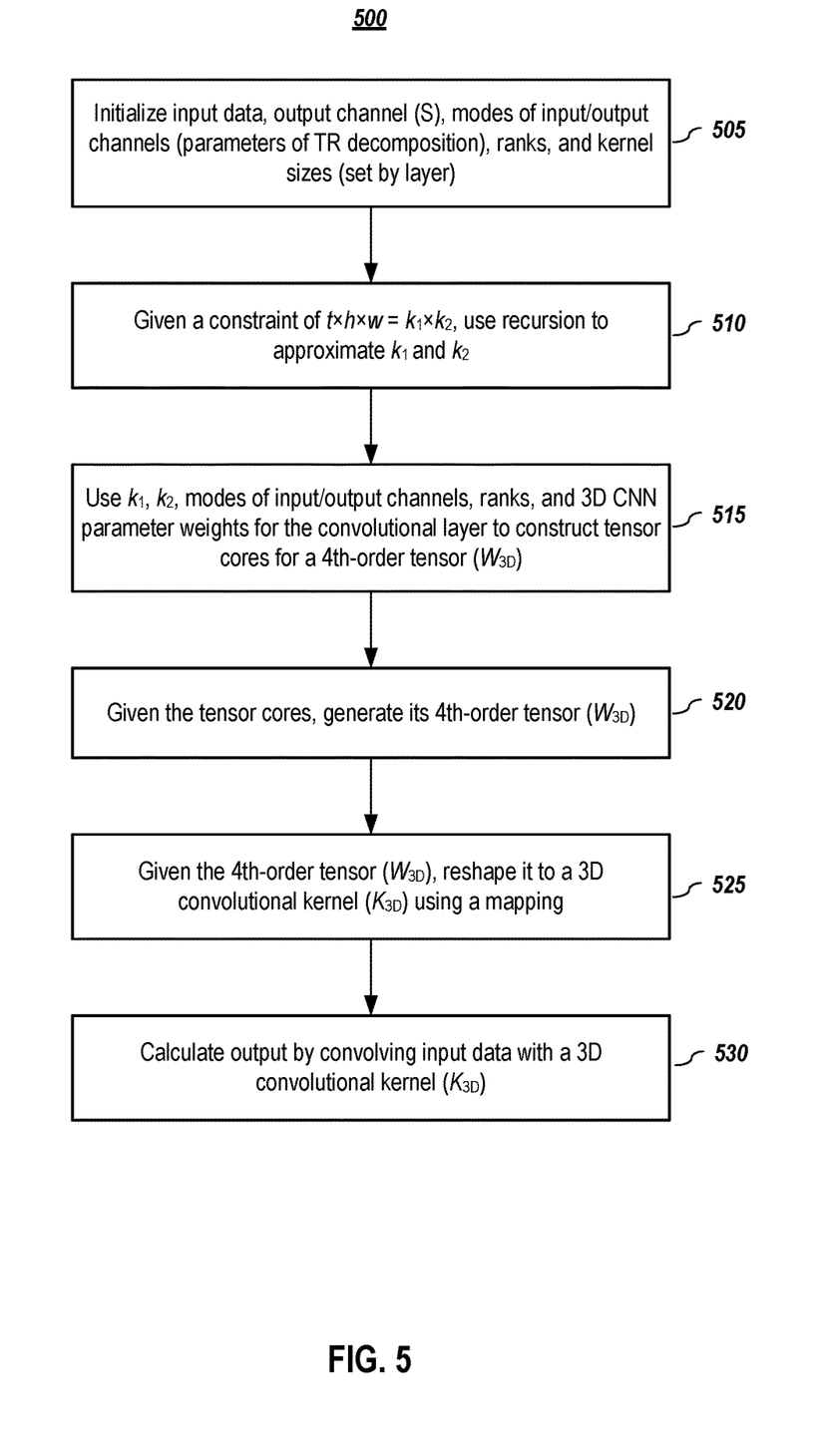
FIG. 5 depicts a methodology for performing tensor ring decomposition, according to embodiments of the present disclosure.

FIG. 5 depicts a methodology for performing tensor ring decomposition, according to embodiments of the present disclosure. In one or more embodiments, certain data may be initialized (505). Input data, output channel (S), modes of input/output channels (parameters of TR decomposition), ranks, and kernel sizes (set by layer). Given a dimensionality constraint in which a reduced dimensionality equals at least a subset of dimensionality of the neural network layer in which the subset of dimensionality has more dimensions than the reduced dimensionality, values for the reduced dimensionality are approximated (510). For example, in one or more embodiments, given a kernel that is $\mathbb{R}^{t \times h \times w \times C \times S}$, then a constraint to reduce dimensionality may be $t \times h \times w = k_1 \times k_2$, and recursion may be used to approximate values for $k_1$ and $k_2$.

In one or more embodiments, for a neural network that is to be TR decomposed, the values for the reduced dimensionality (e.g., the values $k_1$ and $k_2$), modes of input/output channels for the neural network layer, rank or ranks for the neural network layer, and parameter weights for the neural network layer are used to construct tensor cores for a tensor for the layer. For example, in one or more embodiments, the values $k_1$ and $k_2$ modes of input/output channels, rank or ranks, and parameter weights for the convolutional layer are used (515) to construct tensor cores for a corresponding tensor. In one or more embodiments, the tensor cores are used to generate (520) their corresponding tensor. For example, given the tensor cores for a convolution neural network layer, a 4th-order tensor, $\mathcal{W}_{3D}$, can be generated.

In one or more embodiments, given the tensor, the tensor is reshaped (525) to a kernel using a mapping. For example, given the 4th-order tensor ($\mathcal{W}_{3D}$), the 4th-order tensor may be reshaped to a 3D convolutional kernel ($\mathcal{K}_{3D}$) using a mapping; thereby compressing the layer. In one or more embodiments, the process may be performed on a number of layers in the model.

Finally, in one or more embodiments, an output for the TR-decomposition neural network layer is computed (530) using input data for the layer and the kernel. As noted above, depending upon the embodiment, the output for the compressed layer may be compared with the original output for the layer to check whether its accuracy is still acceptable or whether the layer should undergo the compression process using one or more different parameters. Alternatively or additionally, the overall output of the compressed model may be checked to determine if it acceptable, as discussed in FIG. 4.

Figure 6:
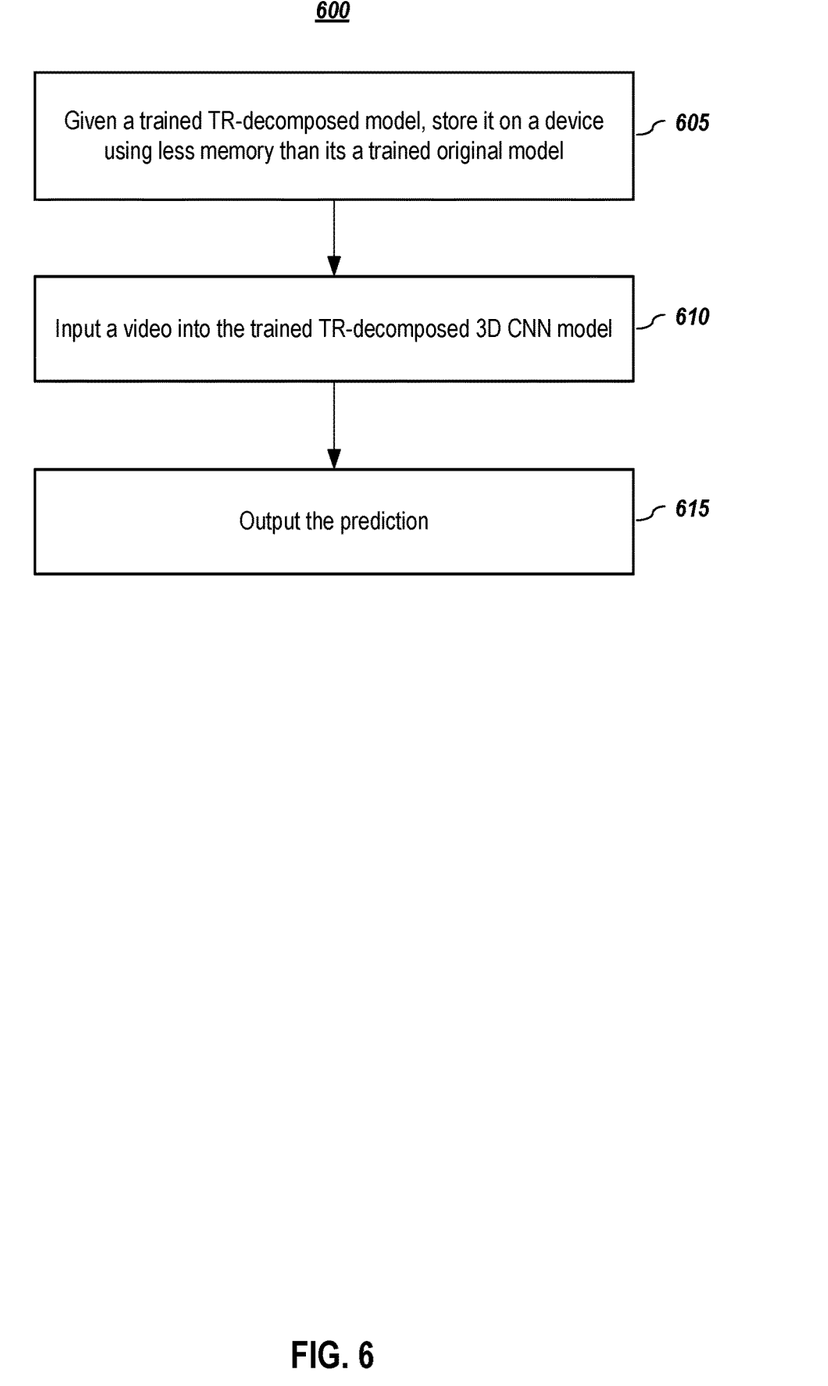
FIG. 6 depicts use of a compressed, trained model, according to embodiments of the present disclosure.

FIG. 6 depicts use of a compressed, trained model, according to embodiments of the present disclosure. In one or more embodiments, given a trained TR-decomposed model, it is stored (605) on a device using less memory than its a trained original model. Because the compressed model uses fewer resources—both to store and to operate—the model can be deployed on resource-constrained devices, such as embedded devices. Assuming the model is a 3D CNN, the compressed model may receive (610) an input video and outputs (615) its prediction or predictions.

One skilled in the art shall recognize that embodiments have several advantages. For example, with tensor ring decomposition, one is able to compress a model, such as a 3D-CNN model, and deploy it on resource-constraint devices. For example, for the 3D-CNN with 5 convolutional layers shown in FIG. 3, when compressed using one of the embodiments herein can save 10×-20× in model size. The exact size of the savings will depend on the tensor ring rank used. With smaller model size, during inference time, the compressed model runs much faster than its original, conventional model and consumes less power. Furthermore, the TR-compressed model can achieve better performance in terms of stability and model accuracy, compared to other tensor decomposition methods.

D. Computing System Embodiments

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, phablet, tablet, etc.), smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read only memory (ROM), and/or other types of memory. Additional components of the computing system may include one or more disk drives, one or more network ports for communicating with external devices as well as various input and output (I/O) devices, such as a keyboard, mouse, stylus, touchscreen and/or video display. The computing system may also include one or more buses operable to transmit communications between the various hardware components.

Figure 7:
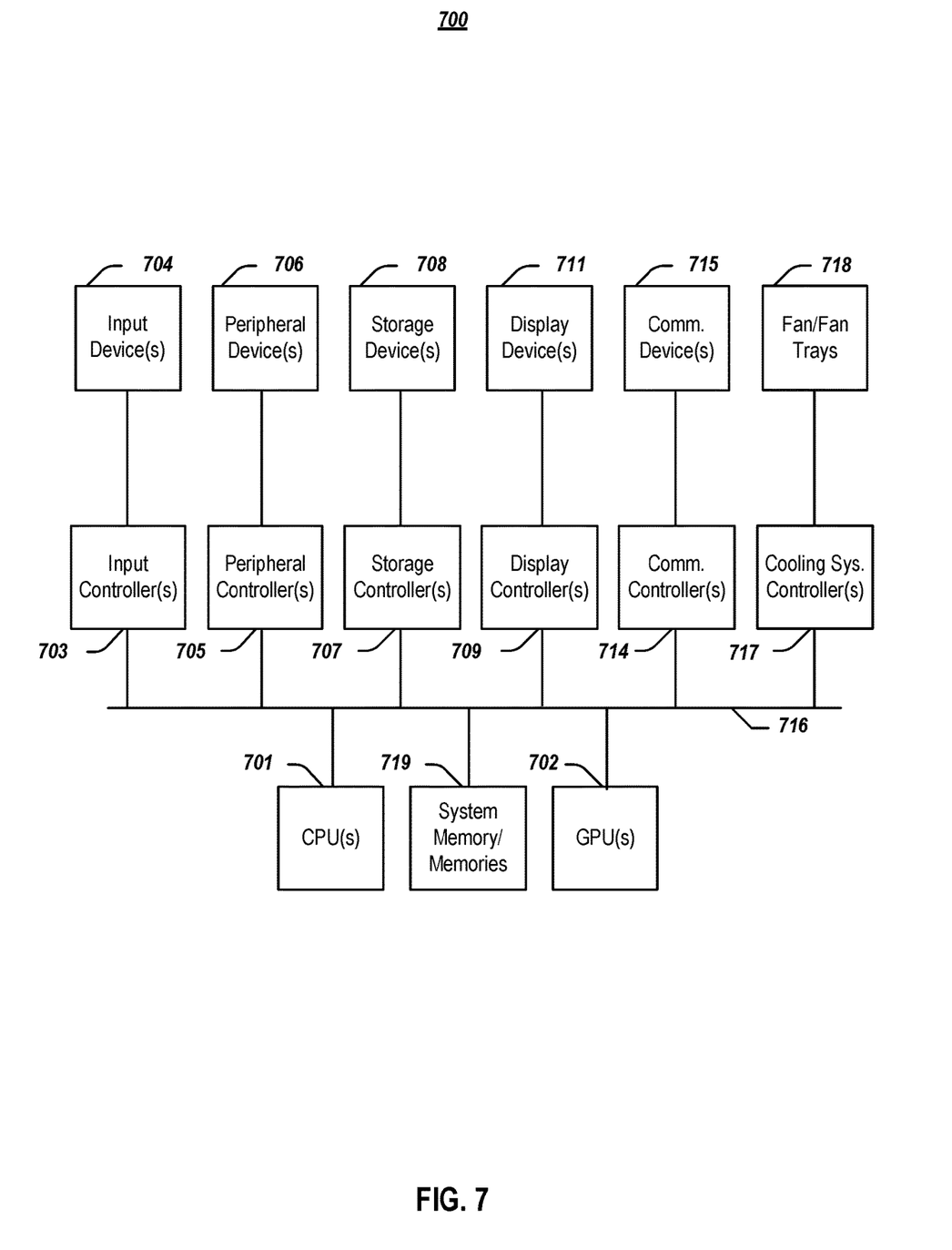
FIG. 7 depicts a simplified block diagram of a computing device/information handling system, according to embodiments of the present disclosure.

FIG. 7 depicts a simplified block diagram of an information handling system (or computing system), according to embodiments of the present disclosure. It will be understood that the functionalities shown for system 700 may operate to support various embodiments of a computing system—although it shall be understood that a computing system may be differently configured and include different components, including having fewer or more components as depicted in FIG. 7.

As illustrated in FIG. 7, the computing system 700 includes one or more central processing units (CPU) 701 that provides computing resources and controls the computer. CPU 701 may be implemented with a microprocessor or the like, and may also include one or more graphics processing units (GPU) 702 and/or a floating-point coprocessor for mathematical computations. In one or more embodiments, one or more GPUs 702 may be incorporated within the display controller 709, such as part of a graphics card or cards. Thy system 700 may also include a system memory 719, which may comprise RAM, ROM, or both.

A number of controllers and peripheral devices may also be provided, as shown in FIG. 7. An input controller 703 represents an interface to various input device(s) 704, such as a keyboard, mouse, touchscreen, and/or stylus. The computing system 700 may also include a storage controller 707 for interfacing with one or more storage devices 708 each of which includes a storage medium such as magnetic tape or disk, or an optical medium that might be used to record programs of instructions for operating systems, utilities, and applications, which may include embodiments of programs that implement various aspects of the present disclosure. Storage device(s) 708 may also be used to store processed data or data to be processed in accordance with the disclosure. The system 700 may also include a display controller 709 for providing an interface to a display device 711, which may be a cathode ray tube (CRT) display, a thin film transistor (TFT) display, organic light-emitting diode, electroluminescent panel, plasma panel, or any other type of display. The computing system 700 may also include one or more peripheral controllers or interfaces 705 for one or more peripherals 706. Examples of peripherals may include one or more printers, scanners, input devices, output devices, sensors, and the like. A communications controller 714 may interface with one or more communication devices 715, which enables the system 700 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 700 comprises one or more fans or fan trays 718 and a cooling subsystem controller or controllers 717 that monitors thermal temperature(s) of the system 700 (or components thereof) and operates the fans/fan trays 718 to help regulate the temperature.

In the illustrated system, all major system components may connect to a bus 716, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, for example: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts.

Examples of tangible computer-readable media include, for example: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implemented method for reducing resource requirements for a neural model comprising:
    given a trained multi-dimensional neural network comprising one or more neural network (NN) layers:
        for each neural network layer from a set of one or more neural network layers from the trained multi-dimensional neural network, using tensor ring (TR) more neural network layers from the trained multi-dimensional neural network, using tensor ring (TR) decomposition to approximate the neural network layer to obtain a TR-decomposed NN layer and to obtain a corresponding TR-decomposed multi-dimensional neural network that comprises one or more TR-decomposed NN layers;
        using validation data on the TR-decomposed NN layer or on the TR-decomposed multi-dimensional neural network to determine if an output from the TR-decomposed NN layer or the TR-decomposed multi-dimensional neural network is within an acceptable threshold as compared to an output from a corresponding NN layer from the trained multi-dimensional neural network or from the trained multi-dimensional neural network;
        responsive to the output not meeting an acceptable threshold value:
            increasing a rank for TR-decomposition of one or more of the NN layers in the set of one or more neural network layers; and
            returning to the step of, for each neural network layer from a set of one or more neural network layers from the trained multi-dimensional neural network, using tensor ring (TR) decomposition to approximate the neural network layer to obtain a TR-decomposed NN layer and to obtain a corresponding TR-decomposed multi-dimensional neural network that comprises one or more TR-decomposed NN layers; and
        responsive to the output meeting an acceptable threshold value:
            re-training the TR-decomposed multi-dimensional neural network using a training dataset until a stop condition is reached; and
            outputting the re-trained TR-decomposed multi-dimensional neural network;
    wherein the trained multi-dimensional neural network is a trained three-dimensional convolutional neural network comprising one or more convolutional neural network layers and the method comprises:
    given the trained three-dimensional convolutional neural network (3D CNN) comprising one or more convolutional neural network (CNN) layers:
        for each CNN layer from a set of one or more CNN layers from the trained 3D CNN, using tensor ring (TR) decomposition to approximate the CNN layer to obtain a TR-decomposed CNN layer and to obtain a corresponding TR-decomposed 3D CNN that comprises one or more TR-decomposed CNN layers;
        using validation data on the TR-decomposed CNN layer or on the TR-decomposed 3D CNN to determine if an output is within an acceptable threshold as compared to an output from a corresponding CNN layer from the trained 3D CNN or from the trained 3D CNN;
        responsive to the output not meeting an acceptable threshold value:
            increasing a rank for TR-decomposition of one or more of the CNN layers in the set of one or more CNN layers; and
            returning to the step of, for each CNN layer from a set of one or more CNN layers from the trained 3D CNN, using tensor ring (TR) decomposition to approximate the CNN layer to obtain a TR-decomposed CNN layer and to obtain a corresponding TR-decomposed 3D CNN that comprises one or more TR-decomposed CNN layers; and
        responsive to the output meeting an acceptable threshold value:
            re-training the TR-decomposed 3D CNN using a training dataset until a stop condition is reached; and
            outputting the re-trained TR-decomposed 3D CNN, which requires less memory to store than the trained 3D CNN.

2. The computer-implemented method of claim 1 wherein the step of for each neural network layer from a set of one or more neural network layers from the trained multidimensional neural network, using tensor ring (TR) decomposition to approximate the neural network layer to obtain a TR-decomposed NN layer and to obtain a corresponding TR-decomposed multi-dimensional neural network that comprises one or more TR-decomposed NN layers, comprises:
    for a neural network layer comprising an output channel, an input channel mode, an output channel mode, a rank for TR-decomposition, and a kernel size with multi-dimensions:

given a constraint in which a reduced dimensionality equals at least a subset of dimensionality of the neural network layer in which the subset of dimensionality has more dimensions than the reduced approximating values for the dimensionality, reduced dimensionality;

using the values for the reduced dimensionality, modes of input/output channels, rank or ranks, and parameter weights for the neural network layer to construct tensor cores for a tensor;

using the tensor cores to generate the tensor;

given the tensor, reshaping the tensor to a kernel using a mapping; and calculating an output for the TR-decomposition neural network layer using input data for the TR-decomposition neural network layer and the kernel.

3. The computer-implemented method of claim 2 wherein approximating values for the reduced dimensionality is performed using recursion.

4. The computer-implemented method of claim 1 wherein the step of for each CNN layer from a set of one or more CNN layers from the trained 3D CNN, using tensor ring (TR) decomposition to approximate the CNN layer to obtain a TR-decomposed CNN layer and to obtain a corresponding TR-decomposed 3D CNN that comprises one or more TR-decomposed CNN layers, comprises:

for a CNN layer comprising an output channel, an input channel mode, an output channel mode, rank, and a kernel size with dimensions of t×h×w×C (length of channel)×S (number of filters);

given a constraint of $k_1 \times k_2 = t \times h \times w$, approximating values for $k_1$ and $k_2$;

using $k_1$, $k_2$, modes of input/output channels, rank or ranks, and parameter weights for the CNN layer to construct tensor cores for a 4th-order tensor;

using the tensor cores to generate the 4th-order tensor;

given the 4th-order tensor, reshaping the 4th-order tensor to a 3D convolutional kernel using a mapping; and calculating an output for the TR-decomposition CNN layer using input data for the TR-decomposition CNN layer and the 3D convolutional kernel.

5. The computer-implemented method of claim 4 wherein approximating values for $k_1$ and $k_2$ is performed using recursion.

6. The computer-implemented method of claim 1 further comprising:

storing the re-trained TR-decomposed multi-dimensional neural network on a computing device for execution, wherein the re-trained TR-decomposed multidimensional neural network uses less memory of the computing device than the trained multi-dimensional neural network.

7. A non-transitory computer-readable medium or media comprising one or more sequences of instructions which, when executed by at least one processor, causes steps comprising:

given a trained multi-dimensional neural network comprising one or more neural network (NN) layers:

for each neural network layer from a set of one or more neural network layers from the trained multi-dimensional neural network, using tensor ring (TR) decomposition to approximate the neural network layer to obtain a TR-decomposed NN layer and a corresponding TR-decomposed multi-dimensional neural network that comprises one or more TR-decomposed NN layers;

using validation data on the TR-decomposed NN layer or on the TR-decomposed multi-dimensional neural network to determine if an output from the TR-decomposed NN layer or the TR-decomposed multi-dimensional neural network is within an acceptable threshold as compared to an output from a corresponding NN layer from the trained multi-dimensional neural network or from the trained multi-dimensional neural network;

responsive to the output not meeting an acceptable threshold value:

increasing a rank for TR-decomposition of one or more of the NN layers in the set of one or more neural network layers; and returning to the step of, for each neural network layer from a set of one or more neural network layers from the trained multi-dimensional neural network, using tensor ring (TR) decomposition to approximate the neural network layer to obtain a TR-decomposed NN layer and to obtain a corresponding TR-decomposed multidimensional neural network that comprises one or more TR-decomposed NN layers; and responsive to the output meeting an acceptable threshold value:

re-training the TR-decomposed multi-dimensional neural network using a training dataset until a stop condition is reached; and outputting the re-trained TR-decomposed multi-dimensional neural network;

wherein the trained multi-dimensional neural network is a trained three-dimensional convolutional neural network comprising one or more convolutional neural network layers and the steps comprises:

given the trained three-dimensional convolutional neural network (3D CNN) comprising one or more convolutional neural network (CNN) layers:

for each CNN layer from a set of one or more CNN layers from the trained 3D CNN, using tensor ring (TR) decomposition to approximate the CNN layer to obtain a TR-decomposed CNN layer and to obtain a corresponding TR-decomposed 3D CNN that comprises one or more TR-decomposed CNN layers;

using validation data on the TR-decomposed CNN layer or on the TR-decomposed 3D CNN to determine if an output is within an acceptable threshold as compared to an output from a corresponding CNN layer from the trained 3D CNN or from the trained 3D CNN;

responsive to the output not meeting an acceptable threshold value:

increasing a rank for TR-decomposition of one or more of the CNN layers in the set of one or more CNN layers; and returning to the step of, for each CNN layer from a set of one or more CNN layers from the trained 3D CNN, using tensor ring (TR) decomposition to approximate the CNN layer to obtain a TR-decomposed CNN layer and to obtain a corresponding TR-decomposed 3D CNN that comprises one or more TR-decomposed CNN layers; and responsive to the output meeting an acceptable threshold value:

re-training the TR-decomposed 3D CNN using a training dataset until a stop condition is reached; and outputting the re-trained TR-decomposed 3D CNN, which requires less memory to store than the trained 3D CNN.

8. The non-transitory computer-readable medium or media of claim 7 wherein the step of for each neural network layer from a set of one or more neural network layers from the trained multi-dimensional neural network, using tensor ring (TR) decomposition to approximate the neural network layer to obtain a TR-decomposed NN layer and to obtain a corresponding TR-decomposed multi-dimensional neural network that comprises one or more TR-decomposed NN layers, comprises:

for a neural network layer comprising an output channel, an input channel mode, an output channel mode, a rank for TR-decomposition, and a kernel size with multi-dimensions:
given a constraint in which a reduced dimensionality equals at least a subset of dimensionality of the neural network layer in which the subset of dimensionality has more dimensions than the reduced dimensionality, approximating values for the reduced dimensionality;
using the values for the reduced dimensionality, modes of input/output channels, rank or ranks, and parameter weights for the neural network layer to construct tensor cores for a tensor;
using the tensor cores to generate the tensor;
given the tensor, reshaping the tensor to a kernel using a mapping; and
calculating an output for the TR-decomposition neural network layer using input data for the TR-decomposition neural network layer and the kernel.

9. The non-transitory computer-readable medium or media of claim 7 wherein the step of for each CNN layer from a set of one or more CNN layers from the trained 3D CNN, using tensor ring (TR) decomposition to approximate the CNN layer to obtain a TR-decomposed CNN layer and to obtain a corresponding TR-decomposed 3D CNN that comprises one or more TR-decomposed CNN layers, comprises:

for a CNN layer comprising an output channel, an input channel mode, an output channel mode, rank, and a kernel size with dimensions of t×h×w×C (length of channel)×S (number of filters);
given a constraint of $k_1 \times k_2 = t \times h \times w$, approximating values for $k_1$ and $k_2$;
using $k_1$, $k_2$, modes of input/output channels, rank or ranks, and parameter weights for the CNN layer to construct tensor cores for a 4th-order tensor;
using the tensor cores to generate the 4th-order tensor;
given the 4th-order tensor, reshaping the 4th-order tensor to a 3D convolutional kernel using a mapping; and
calculating an output for the TR-decomposition CNN layer using input data for the TR-decomposition CNN layer and the 3D convolutional kernel.

10. The non-transitory computer-readable medium or media of claim 9 wherein approximating values for $k_1$ and $k_2$ is performed using recursion.

11. The non-transitory computer-readable medium or media of claim 7 further comprising one or more sequences of instructions which, when executed by at least one processor, causes steps to be performed comprising:
storing the re-trained TR-decomposed multi-dimensional neural network on a computing device for execution, wherein the re-trained TR-decomposed multidimensional neural network uses less memory of the computing device than the trained multi-dimensional neural network.

12. A system comprising:
one or more processors; and
a non-transitory computer-readable medium or media comprising one or more sets of instructions which, when executed by at least one of the one or more processors, causes steps to be performed comprising:
given a trained three-dimensional convolutional neural network (3D CNN) comprising one or more convolutional neural network (CNN) layers:
for each CNN layer from a set of one or more CNN layers from the trained 3D CNN, using tensor ring (TR) decomposition to approximate the CNN layer to obtain a TR-decomposed CNN layer and to obtain a corresponding TR-decomposed 3D CNN that comprises one or more TR-decomposed CNN layers;
using validation data on the TR-decomposed CNN layer or on the TR-decomposed 3D CNN to determine if an output from the TR-decomposed CNN layer or the TR-decomposed multi-dimensional neural network is within an acceptable threshold as compared to an output from a corresponding CNN layer from the trained 3D CNN or from the trained 3D CNN;
responsive to the output not meeting an acceptable threshold value:
increasing a rank for TR-decomposition of one or more of the CNN layers in the set of one or more CNN layers; and
returning to the step of, for each CNN layer from a set of one or more CNN layers from the trained 3D CNN, using tensor ring (TR) decomposition to approximate the CNN layer to obtain a TR-decomposed CNN layer and to obtain a corresponding TR-decomposed 3D CNN that comprises one or more TR-decomposed CNN layers; and
responsive to the output meeting an acceptable threshold value:
re-training the TR-decomposed 3D CNN using a training dataset until a stop condition is reached; and
outputting the re-trained TR-decomposed 3D CNN, which requires less memory to store than the trained 3D CNN.

13. The system of claim 12 wherein the step of for each CNN layer from a set of one or more CNN layers from the trained 3D CNN, using tensor ring (TR) decomposition to approximate the CNN layer to obtain a TR-decomposed CNN layer and to obtain a corresponding TR-decomposed 3D CNN that comprises one or more TR-decomposed CNN layers, comprises:

for a CNN layer comprising an output channel, an input channel mode, an output channel mode, rank, and a kernel size with dimensions of t×h×w×C (length of channel)×S (number of filters);
given a constraint of $k_1 \times k_2 = t \times h \times w$, approximating values for $k_1$ and $k_2$;
using $k_1$, $k_2$, modes of input/output channels, rank or ranks, and parameter weights for the CNN layer to construct tensor cores for a 4th-order tensor;
using the tensor cores to generate the 4th-order tensor;

given the 4th-order tensor, reshaping the 4th-order tensor to a 3D convolutional kernel using a mapping; and calculating an output for the TR-decomposition CNN layer using input data for the TR-decomposition CNN layer and the 3D convolutional kernel.

14. The system of claim 13 wherein approximating values for $k_1$ and $k_2$ is performed using recursion.

15. The system of claim 12 wherein the non-transitory computer-readable medium or media further comprises one or more sets of instructions which, when executed by at least one of the one or more processors, causes steps to be performed comprising:

storing the re-trained TR-decomposed 3D CNN on a computing device for execution, wherein the re-trained TR-decomposed 3D CNN uses less memory of the computing device than the trained 3D CNN.

16. A system comprising:

one or more processors; and a non-transitory computer-readable medium or media comprising a trained TR-decomposed multi-dimensional neural network that requires less computer-readable medium or media storage than its corresponding trained multi-dimensional neural network that is not TR-decomposed and the trained TR-decomposed multi-dimensional neural network having been generated by performing the steps comprising:

for each neural network layer from a set of one or more neural network layers from the trained multi-dimensional neural network, using tensor ring (TR) decomposition to approximate the neural network layer to obtain a TR-decomposed NN layer and to obtain a corresponding TR-decomposed multi-dimensional neural network that comprises one or more TR-decomposed NN layers;

using validation data on the TR-decomposed NN layer or on the TR-decomposed multi-dimensional neural network to determine if an output from the TR-decomposed CNN layer or the TR-decomposed multi-dimensional neural network is within an acceptable threshold as compared to an output from a corresponding NN layer from the trained multi-dimensional neural network or from the trained multi-dimensional neural network;

responsive to the output not meeting an acceptable threshold value:

increasing a rank for TR-decomposition of one or more of the NN layers in the set of one or more neural network layers; and returning to the step of, for each neural network layer from a set of one or more neural network layers from the trained multi-dimensional neural network, using tensor ring (TR) decomposition to approximate the neural network layer to obtain a TR-decomposed NN layer and to obtain a corresponding TR-decomposed multidimensional neural network that comprises one or more TR-decomposed NN layers; and responsive to the output meeting an acceptable threshold value:

re-training the TR-decomposed multi-dimensional neural network using a training dataset until a stop condition is reached; and outputting the TR-decomposed multi-dimensional neural network;

wherein the trained multi-dimensional neural network is a trained three-dimensional convolutional neural network comprising one or more convolutional neural network layers;

wherein the step of for each neural network layer from a set of one or more neural network layers from the trained multi-dimensional neural network, using tensor ring (TR) decomposition to approximate the neural network layer to obtain a TR-decomposed NN layer and to obtain a corresponding TR-decomposed multi-dimensional neural network that comprises one or more TR-decomposed NN layers comprises:

for a CNN layer comprising an output channel, an input channel mode, an output channel mode, rank, and a kernel size with dimensions of t×h×w×C (length of channel)×S (number of filters);

given a constraint of $k_1 \times k_2 = t \times h \times w$, approximating values for $k_1$ and $k_2$;

using $k_1$, $k_2$, modes of input/output channels, rank or ranks, and parameter weights for the CNN layer to construct tensor cores for a 4th-order tensor;

using the tensor cores to generate the 4th-order tensor;

given the 4th-order tensor, reshaping the 4th-order tensor to a 3D convolutional kernel using a mapping; and calculating an output for the TR-decomposition NN layer using input data for the TR-decomposition NN layer and the 3D convolutional kernel.

* * * * *